Oct. 13, 1942.  E. W. LAGER  2,298,569
REFRIGERATED VEHICLE
Filed July 22, 1940  2 Sheets-Sheet 1

Eric Willard Lager
INVENTOR

ATTEST —

Oct. 13, 1942.　　　　E. W. LAGER　　　　2,298,569
REFRIGERATED VEHICLE
Filed July 22, 1940　　　　2 Sheets-Sheet 2

ATTEST-

Wm C. Meiser

Eric Willard Lager
INVENTOR
BY R. J. Story
ATTORNEY

Patented Oct. 13, 1942

2,298,569

UNITED STATES PATENT OFFICE 2,298,569

REFRIGERATED VEHICLE

Eric Willard Lager, Palos Park, Ill., assignor to Industrial Patents Corporation, Chicago, Ill., a corporation of Delaware Application July 22, 1940, Serial No. 346,780

1 Claim. (Cl. 62—24)

This invention relates to improvements in air conditioners, especially adaptable for use in transport vehicle bodies.

One of the objects of the invention is to provide an improved air conditioner unit.

Another object of the invention is to provide an improved air conditioner unit especially adaptable for use in trucks, railway cars and the like.

Another object of the invention is to provide an improved air conditioner unit in which a liquid medium is carried first in direct contact with a chilling medium, and thence immediately across the current of treated air.

Another object of the invention is to provide an improved air conditioner unit in which prechilled air is carried in direct contact with a chilled liquid medium.

Other objects of the invention will be apparent from the description and claim which follow.

In the drawings, like characters of reference are used to designate similar elements.

Figure 2:
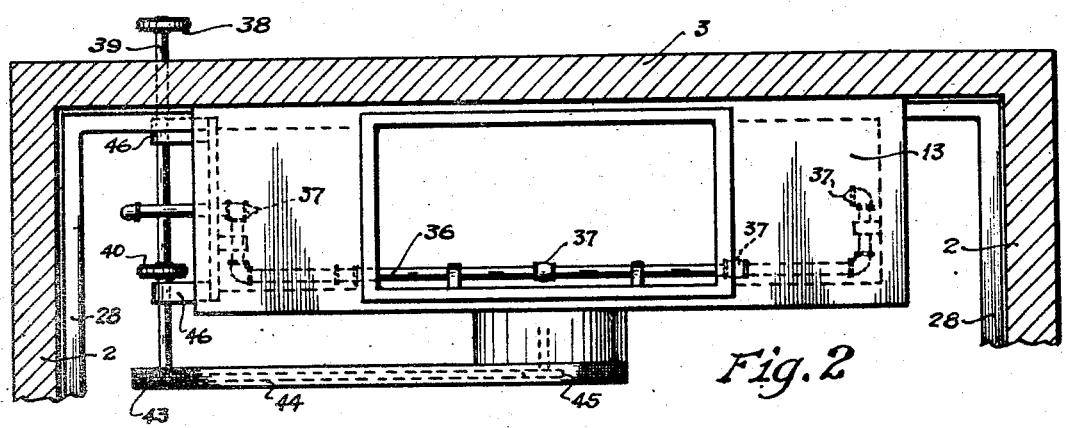
Figure 2 is a top plan view, partly in section, of Figure 1.
Figure 1:
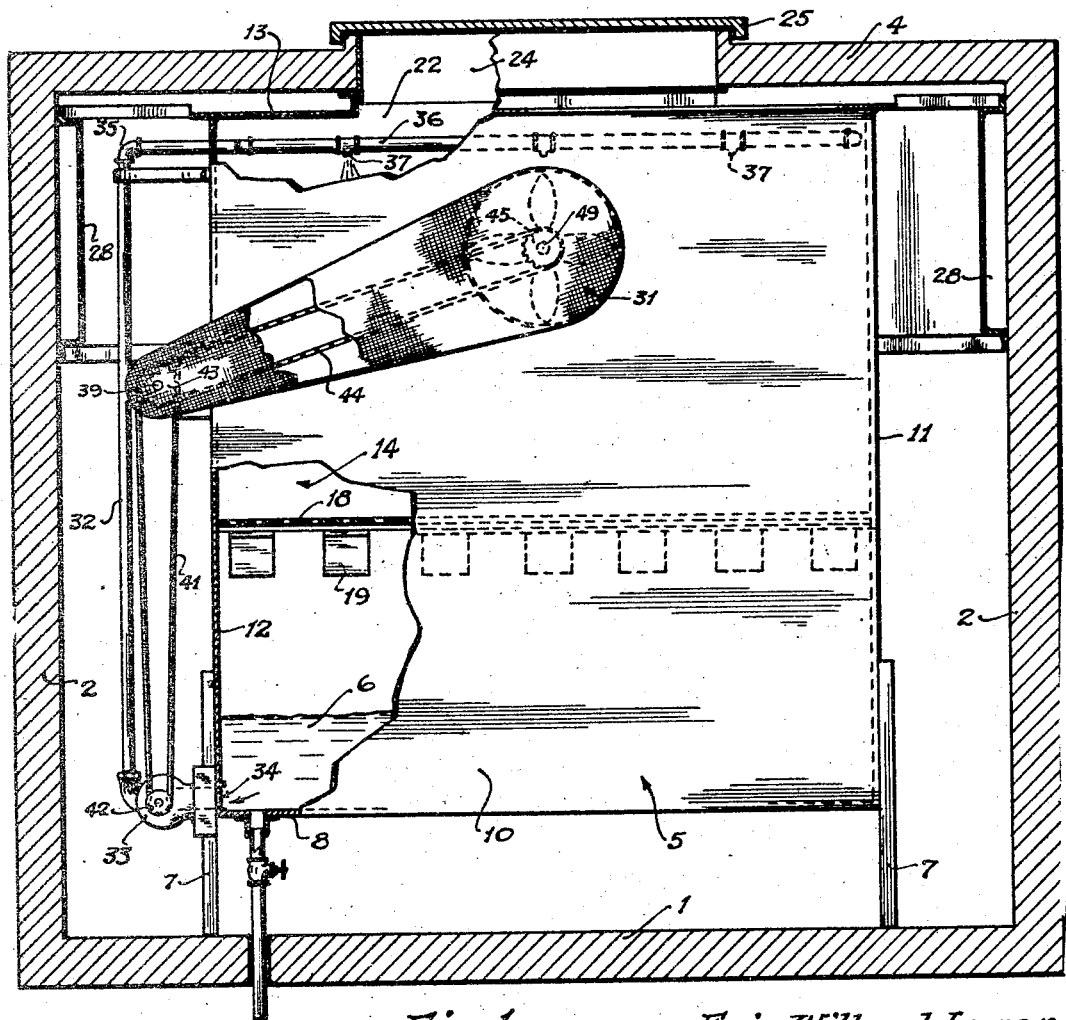
Figure 1 is a front elevational view, partly in section, illustrating the air conditioner unit mounted adjacent one end wall of an enclosure which, for purposes of illustration, is an automobile truck body.
Figure 3:
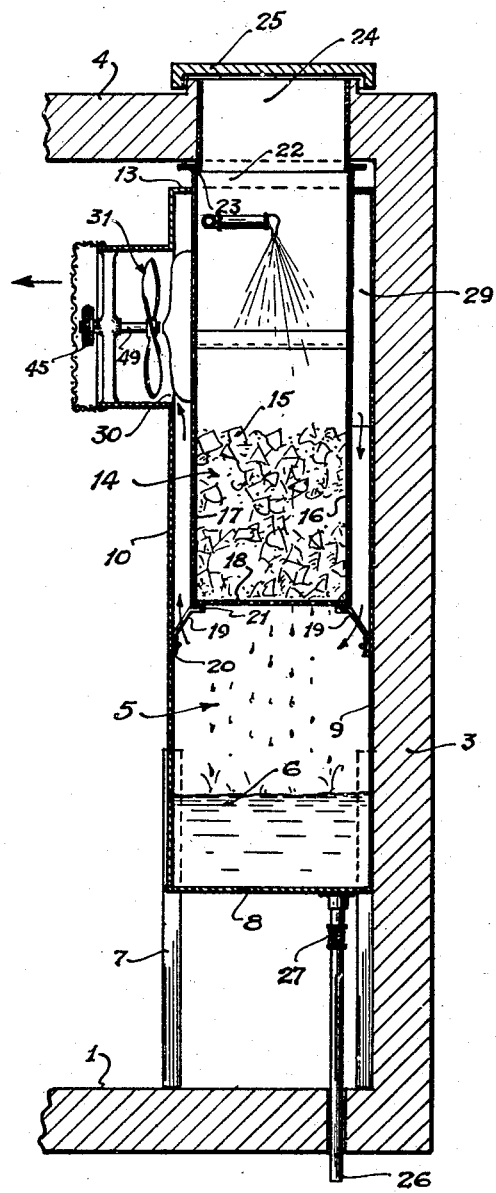
Figure 3 is a sectional view taken substantially on line 3—3 of Figure 2.
Figure 4:
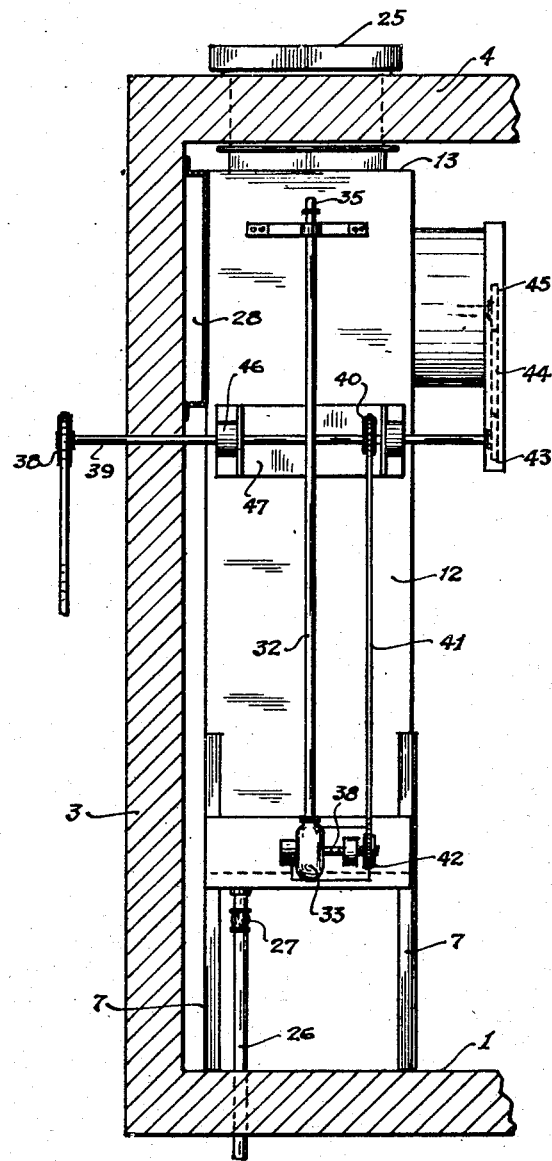
Figure 4 is an end elevational view, partly in section, of Figure 1.

The enclosure partially shown in the drawings, is an automobile truck body, having a bottom 1, opposite side walls 2, rear wall 3, top wall 4, and a front wall not shown.

The air conditioner unit of the present invention preferably is mounted adjacent rear wall 3 and comprises broadly an enclosed reservoir 5 adapted to contain a body 6 of a liquid medium which, for example, may be brine. Reservoir 5 is mounted upon standards 7 and is formed of bottom wall 8, opposite side walls 9 and 10, opposite end walls 11 and 12, and top wall 13.

Chamber 14 is adapted to contain a charge of chunk ice 15 or other solidified chilling medium and is encased within the top portion of reservoir 5. Chamber 14 comprises opposite side walls 16 and 17 in spaced relation with side walls 9 and 10, respectively, and perforated bottom wall 18. Opposite end walls 11 and 12 and top wall 13, it is seen, are common to chamber 14 as well as to reservoir 5. Chamber 14 is rigidly maintained within reservoir 5 as by top wall 13, and a plurality of spaced brackets 19 welded or otherwise rigidly secured to side walls 9 and 10, as at 20, and to bottom wall 18 as at 21.

Chamber 14 at opening 22 is extended in sealed relationship with top 4, as at 23, and thereat communicates with hatch opening 24 for the admission of the liquid and chilling mediums. Hatch opening 24 is openably sealed as by hatch door 25. Reservoir 5 is provided with drain conduit 26 provided with valve 27.

As shown in the drawings, an inlet air duct 28 is extended from against each of side walls 2, preferably from approximately the forward end of the enclosure into communication with reservoir 5 through a suitable opening 29 provided in each of end walls 11 and 12, adjacent top wall 13 and between spaced side walls 9 and 16. Also, as shown in the drawings, side wall 17 is provided with air outlet opening 30, in which is positioned draft fan 31.

Since, as has been pointed out, end walls 11 and 12 and top wall 13 are common to chamber 14, as well as to reservoir 5, it is seen that warm air drawn through openings 29 by the action of fan 31, is forced to pass first between spaced walls 9 and 16, secondly, through the air space provided between the body 6 of liquid medium and perforated bottom wall 18 and third, between spaced walls 10 and 17, whence it is again discharged through opening 30 into the truck body enclosure. In order to secure the extreme drop or differential in the temperature of the air passing between inlets 29 and outlets 30, the present invention purposes to continuously recirculate the body 6 of chilling medium into direct contact with the charge of solidified chilling medium 15, whence in chilled condition, the liquid medium will drain through perforated bottom 18 to traverse the circulated air as it passes through the air space between the body 6 of liquid medium and the perforated bottom 18.

The liquid medium circulating means comprises conduit 32 provided with force circulating means 33 which conduit at one end, as at opening 34, communicates with the body of liquid medium 6 and at its opposite end, as at 35, communicates with header 36. Header 36 is arranged adjacent the top of chamber 14 and is provided with a plurality of spray outlet nozzles 37 arranged to spray the liquid medium directly upon the charge of solidified chilling medium 15.

The fan 31 and force circulating means 33 are operated from a common source of power, preferably from a small gasoline engine, not shown, situated to the outside of the truck body enclosure. This engine operably engages pulley 38, which through the medium of shaft 39, pulley 40, belt 41, and pulley 42, operates the force circulating means, and, which through the medium of shaft 39, pulley 43, chain 44, and pulley 45, operates the fan 31. The shaft 39 is journaled within bearings 46 rigidly secured to end wall 12 as by bracket 47. Each of the pulleys 38, 40, and 43 is pinioned to shaft 39. Pulley 42 is pinioned to the pump shaft 48. Pulley 45 is pinioned to the fan shaft 49.

It is seen that the device of the present invention is simply constructed and also that it may be made of light materials which makes it especially adaptable for use in truck or other transport vehicle bodies. Also, it is seen that in the unit of the present invention, the incoming warm air is prechilled first by its contact with the outer wall 16 of chamber 14 and thence that it is chilled to a much lower limit by direct contact with the chilled liquid medium draining from perforated bottom 18. In actual tests, it has been found that the temperature of the air drawn through the unit of the present invention, is lowered approximately 20° F.

Obviously many modifications and variations of the invention hereinbefore set forth may be made without departing from the spirit and scope thereof, and therefore only such limitations should be imposed as are indicated in the appended claim.

I claim:

A refrigerating unit for truck bodies comprising a brine container having a top, bottom, side and end walls, an ice bunker having a perforated bottom wall mounted within the top portion of the brine container and in spaced relation with opposite side walls of the brine container and providing a continuous air passage between the opposite side walls, an air space between the brine in the container and the perforated bottom wall of the ice bunker, an air inlet adjacent to the top of the brine container communicating with the air space and with the air passage defined by one pair of spaced side walls of the ice bunker and the brine container, an air outlet adjacent to the top of the brine container communicating with the air space and with the air passage defined by the opposite pair of spaced side walls of the ice bunker and the brine container, a conduit provided with force circulating means extending from the bottom of the brine container into the ice bunker and above the ice contained therein and having a plurality of spray outlet nozzles adapted to spray the brine delivered from the brine container directly in contact with the ice in the ice bunker whereby the brine will drain through the ice and become chilled thereby and will drain by gravity through the perforated bottom of the ice bunker and across the air space, and means including a fan for causing the continuous circulation of fresh air through the air passage and air space whereby the incoming warm air is prechilled by contact with the outer walls of the ice bunker and then chilled to a much lower degree by direct contact with the chilled brine trickling from the perforated bottom wall of the ice bunker.

ERIC WILLARD LAGER.